(12) United States Patent
van der Ham et al.

(10) Patent No.: US 10,779,181 B2
(45) Date of Patent: Sep. 15, 2020

(54) MEASUREMENT SYSTEM

(71) Applicant: Aktiebolaget SKF, Gothenburg (SE)

(72) Inventors: Andreas Clemens van der Ham, Utrecht (NL); Arnaud Pinoit, Utrecht (NL); Feng Qiu, IJsselstein (NL); Johann Wittenberg, Gerolzhofen (DE)

(73) Assignee: Aktiebolaget SKF, Gothenburg (SE)

( * ) Notice: Subject to any disclaimer, the term of this patent is extended or adjusted under 35 U.S.C. 154(b) by 45 days.

(21) Appl. No.: 16/272,004

(22) Filed: Feb. 11, 2019

(65) Prior Publication Data

US 2019/0261205 A1 Aug. 22, 2019

(30) Foreign Application Priority Data

Feb. 19, 2018 (DE) .................. 10 2018 202 440

(51) Int. Cl.
| | | |
|---|---|---|
| *H04W 24/10* | (2009.01) | |
| *H04B 1/69* | (2011.01) | |
| *H04L 5/00* | (2006.01) | |
| *H04W 72/04* | (2009.01) | |
| *H04W 4/38* | (2018.01) | |
| *H04W 52/02* | (2009.01) | |
| *H04L 29/06* | (2006.01) | |
| *H04L 29/08* | (2006.01) | |

(52) U.S. Cl.
CPC .............. *H04W 24/10* (2013.01); *H04B 1/69* (2013.01); *H04L 5/0044* (2013.01); *H04L 67/28* (2013.01); *H04L 69/14* (2013.01); *H04W 4/38* (2018.02); *H04W 52/028* (2013.01); *H04W 52/0229* (2013.01); *H04W 72/0446* (2013.01); *H04W 72/0453* (2013.01); *H04B 2001/6912* (2013.01)

(58) Field of Classification Search
CPC ... H04W 24/10; H04W 4/38; H04W 52/0229; H04W 52/028
See application file for complete search history.

(56) References Cited

U.S. PATENT DOCUMENTS

2018/0027490 A1  1/2018 Liu et al.

OTHER PUBLICATIONS

SKF, "SKF Spherical Roller Bearing" SKF Spherical Roller Bearings, May 2007.
Schaeffler Technologies GmbH & Co. KG, "The Design of Rolling Bearings" FAG The design of rolling bearings, Jul. 2011.
DIN German Institute for Standardization e.V., "Roiling Bearings—Radial spherical roller bearings—Part 2: Double row, cylindrical and tapered bore" DIN German Institute for Standardization e,V., Jan. 2009.

*Primary Examiner* — Mohammad S Anwar
(74) *Attorney, Agent, or Firm* — Garcia-Zamor Intellectual Property Law; Ruy Garcia-Zamor; Bryan Peckjian

(57) ABSTRACT

A measurement system with improved data transmission capabilities to enable efficient data transfers in a radio frequency difficult environment. According to the invention two different data transmission protocols are used, each transmitting within its own radio frequency band. The first data transmission protocol is an unsynchronized network where nodes can actively poke a concentrator to get attention. When a node has the concentrator's attention, the concentrator will then switch the node over to a second data transmission protocol which is a time division multiplexing network at a different frequency band. The TDM network is able to selectively and efficiently transfer both small and larger data packets. The concentrator is able to have both networks active at the same time.

9 Claims, 3 Drawing Sheets

MEASUREMENT SYSTEM

CROSS-REFERENCE

This application claims priority to German patent application no. 102018202440.5 filed on Feb. 19, 2018, the contents of which are fully incorporated herein by reference.

TECHNOLOGICAL FIELD

The invention concerns transmission of large amounts of data from one or more communication network nodes with sensors to one or more concentrators and is more particularly directed to transferring data under strict time constraints from nodes attached directly or indirectly to rolling element bearings.

BACKGROUND

A rolling element bearing comprises an inner ring, an outer ring and several rolling elements or bodies installed between these two rings. These rolling elements can be balls, rollers or needles. In the meaning of the invention, a rolling bearing and a rolling element bearing can be, for instance, a ball bearing, a roller bearing or a needle bearing.

In the field of rolling element bearings, it is known to attach one or more sensors to measure one or more physical parameters and transduce these physical parameters into electrical signals. When it comes to testing bearings in a test center, each bearing may be full of sensors to measure anything from temperature to load at different places on and parts of the bearing. In large size bearings there might even be sensors within one or more of its rollers. Bearings pose one big problem when trying to wirelessly collect all the data that the sensors are producing, bearings are mostly made of steel. Wireless transmission, especially using radio frequencies, and steel do not go well together. That the data transfer rate will go down and the nodes don't have an unlimited buffer space creates a problem. There is still room for improvements.

SUMMARY

An object of the invention is to define a measurement system with an efficient data transfer with low overhead between one or more nodes and one or more corresponding concentrators.

The aforementioned object is achieved by a measurement system with improved data transmission capabilities to enable efficient data transfers in a radio frequency difficult environment. According to the invention two different data transmission protocols are used, each transmitting within its own radio frequency band. The first data transmission protocol is an unsynchronized network where nodes can actively poke a concentrator to get attention. When a node has the concentrator's attention, the concentrator will then switch the node over to a second data transmission protocol which is a time division multiplexing network at a different frequency band. The TDM network is able to selectively and efficiently transfer both small and larger data packets. The concentrator is able to have both networks active at the same time.

The aforementioned object is also achieved according to the invention by a measurement system comprising a concentrator and one or more nodes. The concentrator comprises a first transceiver operating in a first radio frequency band with a first data transmission protocol and a second transceiver operating in a second radio frequency band with a second data transmission protocol. Each of the one or more nodes comprises a multiband transceiver, one or more sensors and/or means to connect to one or more sensors, and a node controller. The multiband transceiver is arranged to be able to switch between the first radio frequency band with the first data transmission protocol and the second radio frequency band with the second data transmission protocol. The one or more sensors convert one or more physical magnitudes to electrical sensor signals and/or have means to connect to one or more sensors that convert one or more physical magnitudes to electrical sensor signals. The node controller is arranged to via the second data transmission protocol transfer the electrical sensor signals to the concentrator. According to the invention the concentrator further comprises a concentrator controller that is arranged to continuously listen with the first transceiver for status messages from the one or more nodes and when receiving a status message from a node, then sending a message back to that node with instructions to switch communication to the second frequency band together with parameters for that node for the second data transmission protocol. The node controller is also arranged to default the multiband transceiver upon reset to the first radio frequency band with the first data transmission protocol and then at predetermined time intervals sending a status message and then wait a predetermined wait time interval for a response.

Suitably the second data transmission protocol is a Time Division Multiplexing transmission protocol. Preferably for a broadcast request in the second data transmission protocol, all the nodes get a time slot for response. In some embodiments individual node requests are implemented and for an individual node request in the second data transmission protocol, the addressed node is the only node during that time frame that gets a time slot and that time slot will be allocated all available time in that time frame. Advantageously for a multi node request in the second data transmission protocol, then those addressed nodes are the only nodes during that time frame that get a time slot and those time slots will use all available time in that time frame and be equally divided between them.

Preferably a chirp spread spectrum (CSS) radio modulation technology, such as LoRa is used for the hardware and datalink layers. In some embodiments the measurement system can comprises multiple concentrators in a daisy chain, each concentrator comprises its own nodes. One or more of the multiple concentrators may also be virtual if that would improve the data through put. As the packet length may be limited due to hardware restrictions, it may be useful to have several different concentrator time slots for different sets of nodes, thereby maximizing the efficiency of the data transfer. That is if the number of nodes becomes large, the single node transfer slot becomes large, perhaps larger than the physical limit. It then makes sense to segment the nodes into different concentrator slots, just as if they are daisy-chained. In some embodiments at least some of the sensors are attached directly or indirectly to a bearing part. In some embodiments at least some of the nodes are directly attached to a bearing part.

The different additional enhancements of the measurement system according to the invention can be combined in any desired manner as long as no conflicting features are combined.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 6.

Figure 1:
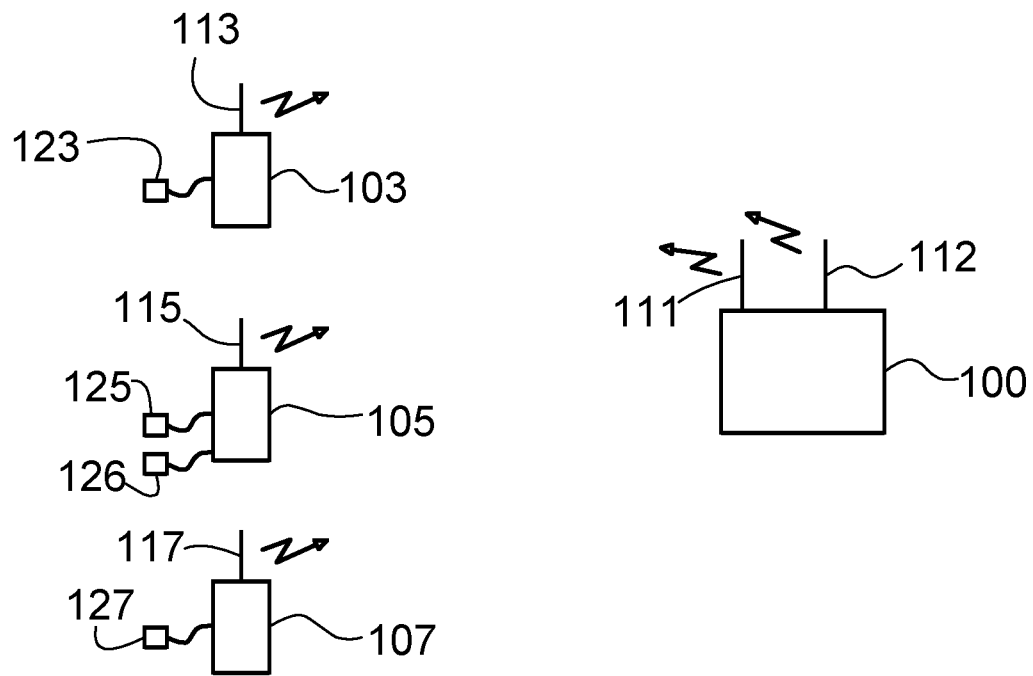
FIG. 1 illustrates a block diagram of a measurement system according to the invention.

FIG. 1 illustrates a block diagram of a measurement system according to the invention. In this example there is one concentrator/gateway 100, with three nodes 103, 105, 107. Each node 103, 105, 107 has its corresponding sensor(s) 123, 125, 126, 127 being integral with a node in question or connectable to a node in question. Each sensor is arranged and meant to be attached either directly or indirectly when in use to an element, such as a part of a rolling element bearing. The concentrator 100 comprises two transceivers 111, 112, each suitably with an antenna. In some embodiments a shared multi band antenna can be used by both transceivers 111, 112. In some other embodiments both or one of the transceivers 111, 112 can have separate transmission and reception antennas. One transceiver 111 works in a first radio frequency band with a first data transmission protocol, and the other 112 works in a second radio frequency band with a second data transmission protocol. The concentrator can and will in use and being active have both transceivers active for simultaneous use. Each of the nodes 103, 105, 107 has a multiband antenna/transceiver 113, 115, 117, each being arranged to be able to switch between the first radio frequency band using the first data transmission protocol and the second radio frequency band using the second data transmission protocol.

The first and the second radio frequency bands are different, the first and the second data transmission protocols are different. The first data transmission protocol is an unsynchronized network, that is the nodes 103, 105, 107 and the concentrator 100 are not synchronized as to when each of the node transceivers 113, 115, 117 can transmit data. In the first data transmission protocol the concentrator 100 will listen and await a status transmission from one or more of the nodes 103, 105, 107, and then more or less directly thereafter send a command/request back to that node. When the nodes are switched to the first data transmission protocol, they will wake up from sleep mode and transmit a status transmission and then wait a predetermined time for a command/request from the concentrator 100. If a node does not receive a command/request within the predetermined time limit, it will go back to sleep mode and then after a predetermined sleep mode time delay, repeat the sequence of transmitting a status transmission etc. The reason that the nodes are in a sleep modes a large part of the time is that they are most likely very low power devices that are powered by batteries, and by keeping a node in sleep mode as much as possible saves energy. If a command/request from the concentrator is received within the predetermined time, the node in question will execute the command/request. According to a first aspect of the invention, this enables the nodes to get the attention of the concentrator via the first data transmission protocol and the system can then add nodes as they come, into the second synchronized data transmission protocol which has a higher effective data transfer rate.

According to the invention, one command/request is to have the node change from the first data transmission protocol working in the first radio frequency band to the second data transmission protocol working in the second radio frequency band. The command/request will then comprise all necessary parameters and synchronization details necessary for the node to move to the second data transmission working in the second radio frequency band. The second data transmission protocol is a synchronized network to achieve a greater data pass through as with the unsynchronized first data transmission protocol there is a high chance of collision of data packets. Suitably there is a collision detect and then a retransmission at a future time, this steals data throughput.

The nodes will initiate to the first data transmission protocol working in the first radio frequency band and the nodes will also default to this if, for example, a watchdog trips or the node goes out of synchronization with the other nodes and the concentrator.

The synchronized second data transmission protocol allocates each node a time slot when it can transmit. More details will follow below.

Figure 2:
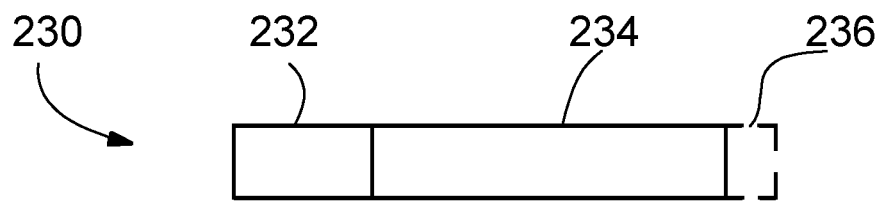
FIG. 2 illustrates a datagram.

FIG. 2 illustrates a datagram 230, a data packet, that can suitably be used both for the first and second data transmission protocols. The datagram 230 comprises a header 232, a payload 234 and optionally a Cyclic Redundancy Check (CRC) 236 of the payload 234. The header 232 commonly comprises a preamble, source and destination addresses, a size of the payload, a CRC of the header, sequence of the datagram, a time stamp, etc. The header 232 comprises at least basic information to get the payload properly to its destination and to tell where it came from. The header 232 and the CRC 236 are both overhead, they are the means for the payload 234 to get from A, source address, to B, destination address. If the payload 234 is the same size in bytes as the header 232, then the overhead is equal to or greater than the payload 234. So if we are able to send packets at a rate of 1000 bytes per second, then the effective data transfer rate is only 500 bytes per second or less. For a second example, we keep the header 232 the same size and if we then increase the payload 234 such that the header 232 only represents 10% of a datagram/packet 230, then with the same rate of 1000 bytes per second we get an effective data transfer rate of 900 bytes per seconds. It will most likely go up even higher since there will be fewer data packets per second and per large set of data, thus the inter packet delays will be fewer as well. That is almost double usable data rate. There has also to be a balance between how big the payload capability in the datagram is and the size of the data sets that are to be transported. If one percent of the data sets are 5000 bytes and the other 99% are 50 bytes, then there would be a huge waste, and a very low effective data rate if the payload size would be fixed at 5000 bytes in all the datagrams/packets. Then 99% of the datagrams would only have a payload of one percent of its capability. We are assuming that each data set must be sent separately. A second aspect of the invention is the ability to change the size of the payload 234 in dependence of capacity availability and data set size.

Figure 3:
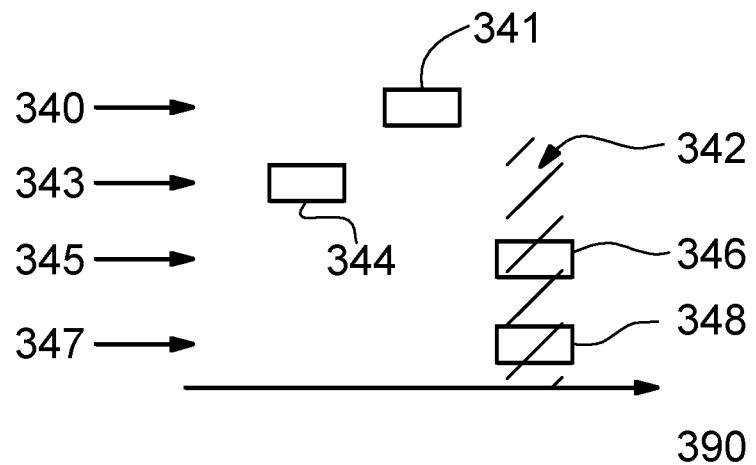
FIG. 3 illustrates an example of a timing diagram of the first data transmission protocol.

FIG. 3 illustrates an example of a timing diagram of the first data transmission protocol along a timeline 390 divided into timeline 340, 343. 345. 347 rows. A first timeline 340 row for packets from a concentrator/gateway, a second timeline 343 row for packets from the first node, a third timeline 345 row for packets from the second node, and a fourth timeline 347 row for packets from the third node.

The first node will at regular intervals wake up from sleep mode and send out a status packet 344. After sending out the status packet, the node will stay awake for a predetermined listening time to see if there is a concentrator/gateway that responds to the status packet with a command/request packet 341. If there is no command/request packet within the predetermined listening time, then the node goes back to sleep and wakes up again after a predetermined sleep time and repeats the process until the command/request packet 341 comes. The concentrator/gateway, having two transceivers, one of them listening in the first radio frequency band working according to the first data transmission protocol. When the concentrator receives a status packet from a node it will send a command/request packet back to the node. This command/request packet may be a command for the node to switch its multi band transceiver to the second radio frequency band and start communication according to the second data transfer protocol. The status requests from the nodes come randomly, in an uncontrolled fashion, thus at times packets collide, this can be seen where a status packet 346 from the second node is sent at exactly the same time as a status packet 348 sent from the third node causing a collision 343 between the two packets, corrupting both packets 346, 348. These packets must thus be resent at different times.

In the first data transmission protocol the units are not synchronized and it is the nodes that take the initiative, randomly and thus prone to collisions that really lowers the transfer rates. In the second data transmission protocol the units are synchronized, and it is the concentrator/gateway that is in charge.

Figure 4:
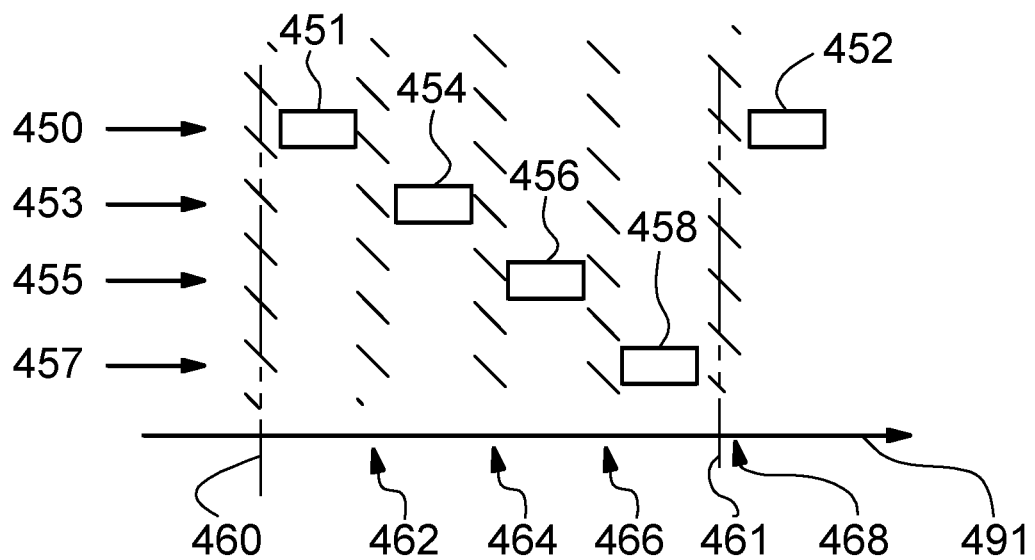
FIG. 4 illustrates an example of a timing diagram of the second data transmission protocol with small payloads from the nodes.

FIG. 4 illustrates an example of a timing diagram of the second data transmission protocol with small payloads from the nodes along a timeline 491 divided into timeline 450, 453, 455, 457 rows. A first timeline 450 row for packets from a concentrator/gateway, a second timeline 453 row for packets from the first node, a third timeline 455 row for packets from the second node, and a fourth timeline 457 row for packets from the third node. In the second data transmission protocol all the nodes are synchronized with the concentrator/gateway. The concentrator will continuously synchronize the nodes so that their individual timing/clocks will not have time to drift to a state where the node cannot communicate within the set constraints. Collisions should not happen. To lessen the risk of collisions happening, there is some elbow room built into the second data transmission protocol. There are small delays/wait times 462, 464, 466, 468 between packets so that small synchronization variations will not cause packets to collide. The nodes will start 460, 461 to listen for a command/request packet 451, 452 from the concentrator a bit before the expected arrival of the packet 451, 452, this will also give a bit of wiggle room regarding the synchronicity between the devices.

In the example shown in FIG. 4, the concentrator sends a broadcasting command/request 451, for example a status request. Since it goes out as a broadcasting request, all nodes will return in this case with a status packet 454, 456, 458 within their allocated time slots. The nodes calculate their individual allocated time slots from the start of the broadcasting request 451. The timeframe is suitably sized so that the timeslots allocated for each node is large enough for the individual status packets 454, 456, 458 from the nodes.

When the nodes are to transfer measurement data from their sensors, the allocated time slots are not large enough for the measurement data. As previously explained, dividing large sets of data into many small packets is not an efficient way of transferring data as the overhead per transferred payload data increases. According to the invention, the enabling a node to use all the timeslots available for all the nodes when a node is individually requested to transfer data.

Figure 5:
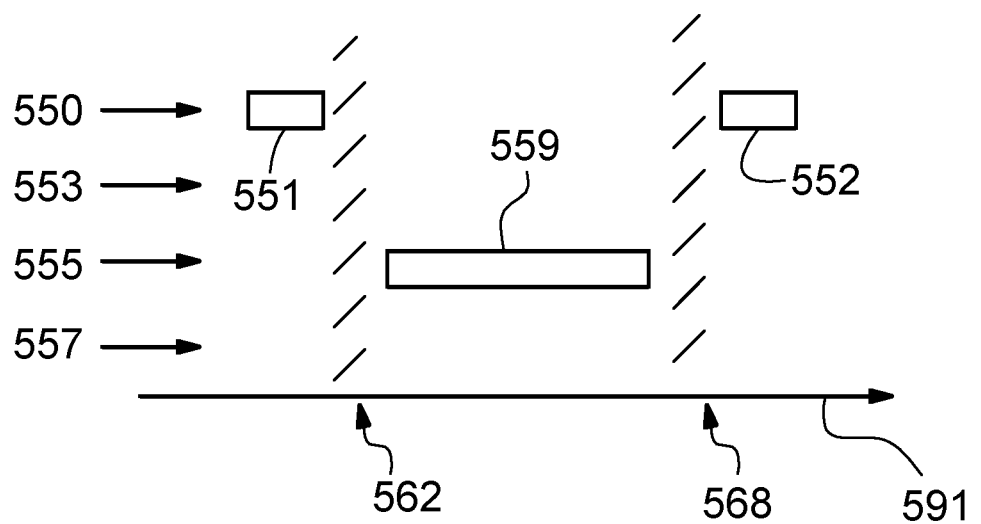
FIG. 5 illustrates an example of a timing diagram of the second data transmission protocol with large payload from the second node.

FIG. 5 illustrates an example of a timing diagram of the second data transmission protocol with large payload from the second node along a timeline 591 divided into timeline 550, 553, 555, 557 rows. A first timeline 550 row for packets from a concentrator/gateway, a second timeline 553 row for packets from the first node, a third timeline 555 row for packets from the second node, and a fourth timeline 557 row for packets from the third node. There are fewer small delays/wait times 562, 568 between packets, as there are not so many packets in a timeframe. Here the concentrator sends an individual command/request packet 551 to the second node, the other nodes will then keep quiet during this time frame and only the second node sends a large data packet 559. This will keep the total overhead for transferring this data very low. The concentrator then sends another command/request packet 552 at the beginning of the following time frame.

Figure 6:
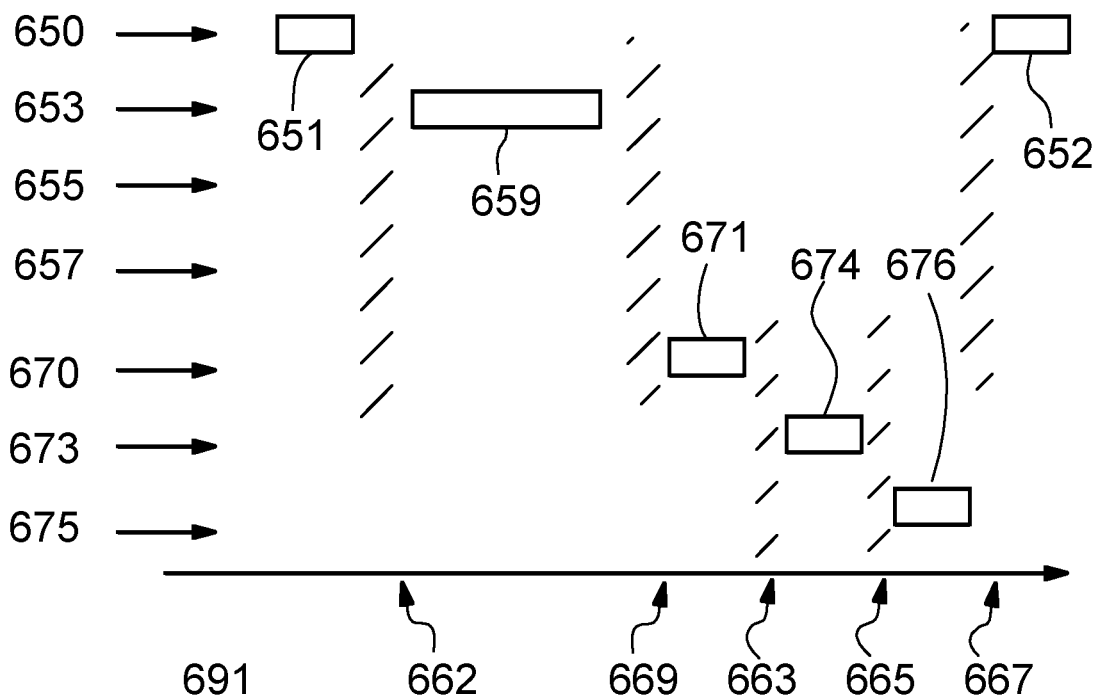
FIG. 6 illustrates an example of a timing diagram of the second data transmission protocol with two concentrators/gateways are daisy chained, the first concentrator/gateway with a large payload from its first node and the second concentrator/gateway with small payloads from its two nodes.

There are occasions when there needs to be an expansion and the only way to manage this is to introduce more concentrators with their attached nodes with sensors. This can be accomplished according to the invention by daisy chaining the concentrators, all using the same two radio frequency bands. FIG. 6 illustrates an example of a timing diagram of the second data transmission protocol with two concentrators/gateways daisy chained, the first concentrator/gateway with a large payload from its first node and the second concentrator/gateway with small payloads from its two nodes. This is illustrated along a timeline 691 divided into timeline 650, 653, 655, 657, 670, 673, 675 rows. A first timeline 650 row for packets from a first concentrator/gateway, a second timeline 653 row for packets from the first node of the first concentrator, a third timeline 655 row for packets from the second node of the first concentrator, a fourth timeline 657 row for packets from the third node of the first concentrator, a fifth timeline 670 row for packets from a second concentrator/gateway. Illustrated are also the wait times 662, 663, 665, 667, 669 between packets to avoid an overlap/collision between packets.

The first concentrator sends an individual request packet 651 to its first node, whereby the first node returns a large data packet 659. Since there are no more time slots allocated for the first concentrator, the second concentrator continues with sending a broadcast status request 671 to its nodes, whereby the first and second nodes of the second concentrator return their statuses in corresponding data packets 674, 676 in their corresponding time slots. When the second concentrator runs out of timeslots, then control is returned to the first concentrator which will then send command/request packet 652.

The invention is based on the basic inventive idea of first using an unsynchronized network for nodes to actively poke a concentrator to get attention, and then the concentrator switching the nodes over to a time division multiplexing network at a different frequency band. The TDM network being able to selectively and efficiently transfer both small and larger data packets. The concentrator being able to have both networks active at the same time. The system can be expanded with daisy-chaining more sets of concentrator frames and their respective nodes either on the same or another concentrator. The invention is not restricted to the above-described embodiments but may be varied within the scope of the following claims.

LISTING OF ELEMENT NUMBERS

FIG. 1 illustrates a block diagram of a measurement system according to the invention:
100 Concentrator/Gateway,
103 First node,
105 Second node,
107 Third node
111 Antenna/transceiver working in a first radio frequency band with a first data transmission protocol,
112 Antenna/transceiver working in a second radio frequency band with a second data transmission protocol,
113 Multiband antenna/transceiver of the first node, being arranged to be able to switch between the first radio frequency band with the first data transmission protocol and the second radio frequency band with the second data transmission protocol,
115 Multiband antenna/transceiver of the second node, being arranged to be able to switch between the first radio frequency band with the first data transmission protocol and the second radio frequency band with the second data transmission protocol,
117 Multiband antenna/transceiver of the third node, being arranged to be able to switch between the first radio frequency band with the first data transmission protocol and the second radio frequency band with the second data transmission protocol,
123 Sensor of the first node,
125 First sensor of the second node,
126 Second sensor of the second node,
127 Sensor of the third node.
FIG. 2 illustrates a datagram,
230 Datagram,
232 Header, commonly comprising preamble, source and destination addresses, size of payload, CRC of header, time stamp, etc.
234 Payload, the data that is to be transferred from source to destination,
236 Possible CRC of payload.
FIG. 3 illustrates an example of a timing diagram of the first data transmission protocol:
340 Timeline of packets from concentrator/gateway,
341 Command/request packet from the concentrator/gateway,
342 Collision,
343 Timeline of packets from the first node,
344 Status packet from the first node,
345 Timeline of packets from the second node,
346 Status packet from the second node,
347 Timeline of packets from the third node,
348 Status packet from the third node,
390 Timeline.

FIG. 4 illustrates an example of a timing diagram of the second data transmission protocol with small payloads from the nodes:
450 Timeline of packets from the concentrator/gateway,
451 Broadcast command/request packet from the concentrator/gateway to all nodes,
452 Command/request packet from the concentrator/gateway,
453 Timeline of packets from the first node,
454 Status/data packet from the first node,
455 Timeline of packets from the second node,
456 Status/data packet from the second node,
457 Timeline of packets from the third node,
458 Status/data packet from the third node,
460 Synchronized time when nodes go from sleep mode to listening for commands/requests from the concentrator/gateway,
461 Synchronized time when nodes go from sleep mode to listening for commands/requests from the concentrator/gateway,
462 Wait time to avoid overlap/collision,
464 Wait time to avoid overlap/collision,
466 Wait time to avoid overlap/collision,
468 Wait time to avoid overlap/collision,
491 Timeline.
FIG. 5 illustrates an example of a timing diagram of the second data transmission protocol with large payload from the second node:
550 Timeline of packets from the concentrator/gateway,
551 Command/request packet from the concentrator/gateway to the second node,
552 Command/request packet from the concentrator/gateway,
553 Timeline of packets from the first node,
555 Timeline of packets from the second node,
559 Large data packet from the second node,
557 Timeline of packets from the third node,
562 Wait time to avoid overlap/collision,
568 Wait time to avoid overlap/collision,
591 Timeline.
FIG. 6 illustrates an example of a timing diagram of the second data transmission protocol with two concentrators/gateways are daisy chained, the first concentrator/gateway with a large payload from its first node and the second concentrator/gateway with small payloads from its two nodes:
650 Timeline of packets from the first concentrator/gateway,
651 Command/request packet from the first concentrator/gateway to its first node,
652 Command/request packet from the first concentrator/gateway,
653 Timeline of packets from the first node of the first concentrator/gateway,
655 Timeline of packets from the second node of the first concentrator/gateway,
657 Timeline of packets from the third node of the first concentrator/gateway,
659 Large data packet from the first node of the first concentrator/gateway,
662 Wait time to avoid overlap/collision,
663 Wait time to avoid overlap/collision,
665 Wait time to avoid overlap/collision,
667 Wait time to avoid overlap/collision,
669 Wait time to avoid overlap/collision,
670 Timeline of packets from the second concentrator/gateway, 671 Broadcast command/request packet from the second concentrator/gateway to all its nodes, 673 Timeline of packets from the first node of the second concentrator/gateway, 674 Status/data packet from the first node of the second concentrator/gateway, 675 Timeline of packets from the second node of the second concentrator/gateway, 676 Status/data packet from the second node of the second concentrator/gateway, 691 Timeline.

What is claimed is:

1. A measurement system comprising:
    a concentrator comprising;
        a first transceiver operating in a first radio frequency band with a first data transmission protocol and;
        a second transceiver operating in a second radio frequency band with a second data transmission protocol;
    one or more nodes, each node comprising;
        a multiband transceiver being arranged to be able to switch between the first radio frequency band with the first data transmission protocol and the second radio frequency band with the second data transmission protocol;
        one or more sensors that convert one or more physical magnitudes to electrical sensor signals or means to connect to one or more sensors that convert one or more physical magnitudes to electrical sensor signals;
        a node controller arranged to transfer the electrical sensor signals to the concentrator via the second data transmission protocol; wherein
    the concentrator further comprises a concentrator controller that is arranged to continuously listen with the first transceiver for status messages from the one or more nodes and when receiving a status message from a node, then sending a message back to that node with instructions to switch communication to the second frequency band together with parameters for that node for the second data transmission protocol, and the node controller is arranged to default upon reset the multiband transceiver to the first radio frequency band with the first data transmission protocol and then at predetermined time intervals to send a status message and then wait a predetermined wait time interval for a response.

2. The measurement system according to claim 1, wherein the second data transmission protocol is a Time Division Multiplex transmission protocol.

3. The measurement system according to claim 1, wherein for a broadcast request in the second data transmission protocol, then all the nodes get a time slot for response.

4. The measurement system according to claim 1, wherein for an individual node request in the second data transmission protocol the addressed node is the only node during that time frame that gets a time slot and that time slot will be allocated all available time in that time frame.

5. The measurement system according to claim 1, wherein for a multi node request in the second data transmission protocol the addressed nodes are the only nodes during that time frame that get a time slot and those time slots will use all available time in that time frame and be equally divided between them.

6. The measurement system according to claim 1, wherein a chirp spread spectrum (CSS) radio modulation technology is used for the hardware and datalink layers.

7. The measurement system according to claim 1, wherein the measurement system comprises multiple concentrators in a daisy chain, each concentrator comprises its own nodes.

8. The measurement system according to claim 1, wherein at least some of the sensors are attached directly or indirectly to a bearing part.

9. The measurement system according to claim 1, wherein at least some of the nodes are directly attached to a bearing part.

* * * * *